April 7, 1970     H. G. FALTIN ETAL     3,504,653
ADHESIVE HANDLING AND COATING MACHINE
Filed Nov. 22, 1967     3 Sheets-Sheet 1
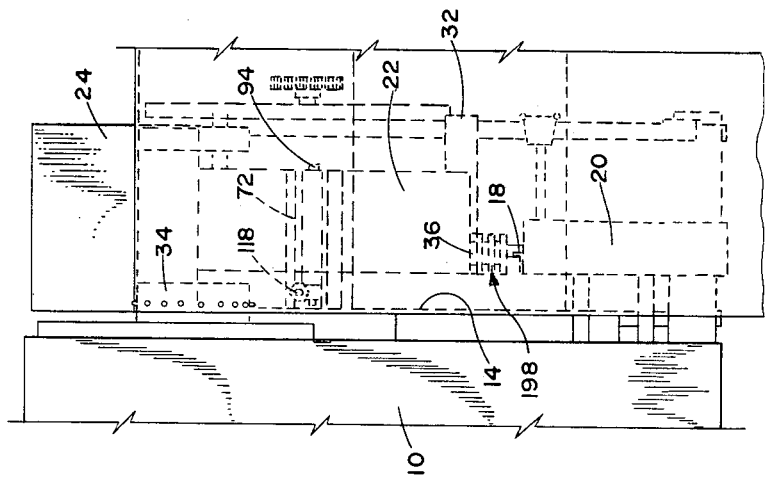
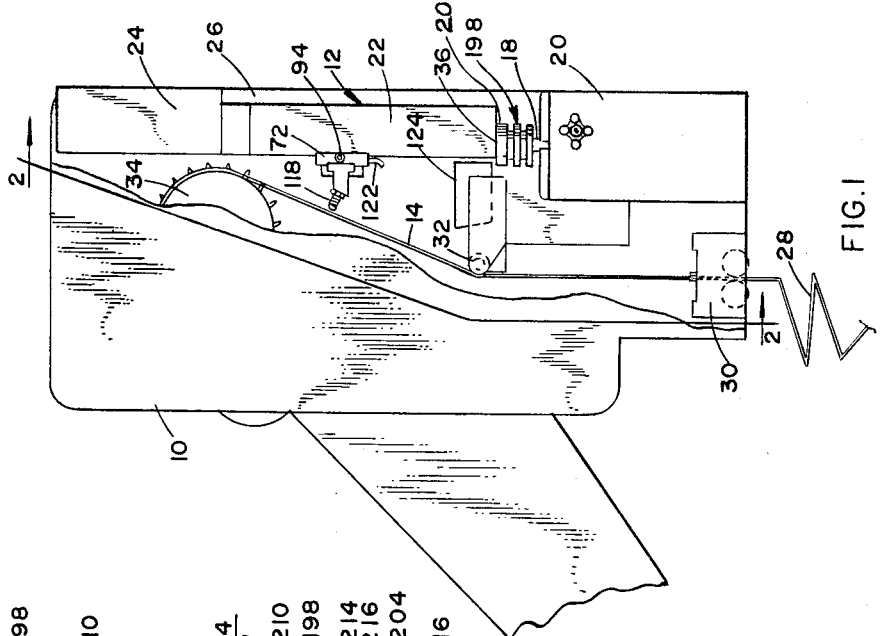
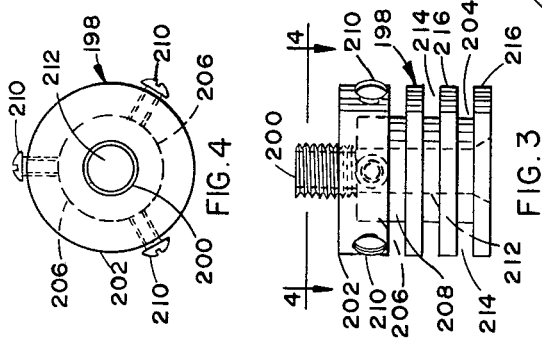
INVENTORS
HANS G. FALTIN
CARL A. SUTTON
BY
ATTORNEY

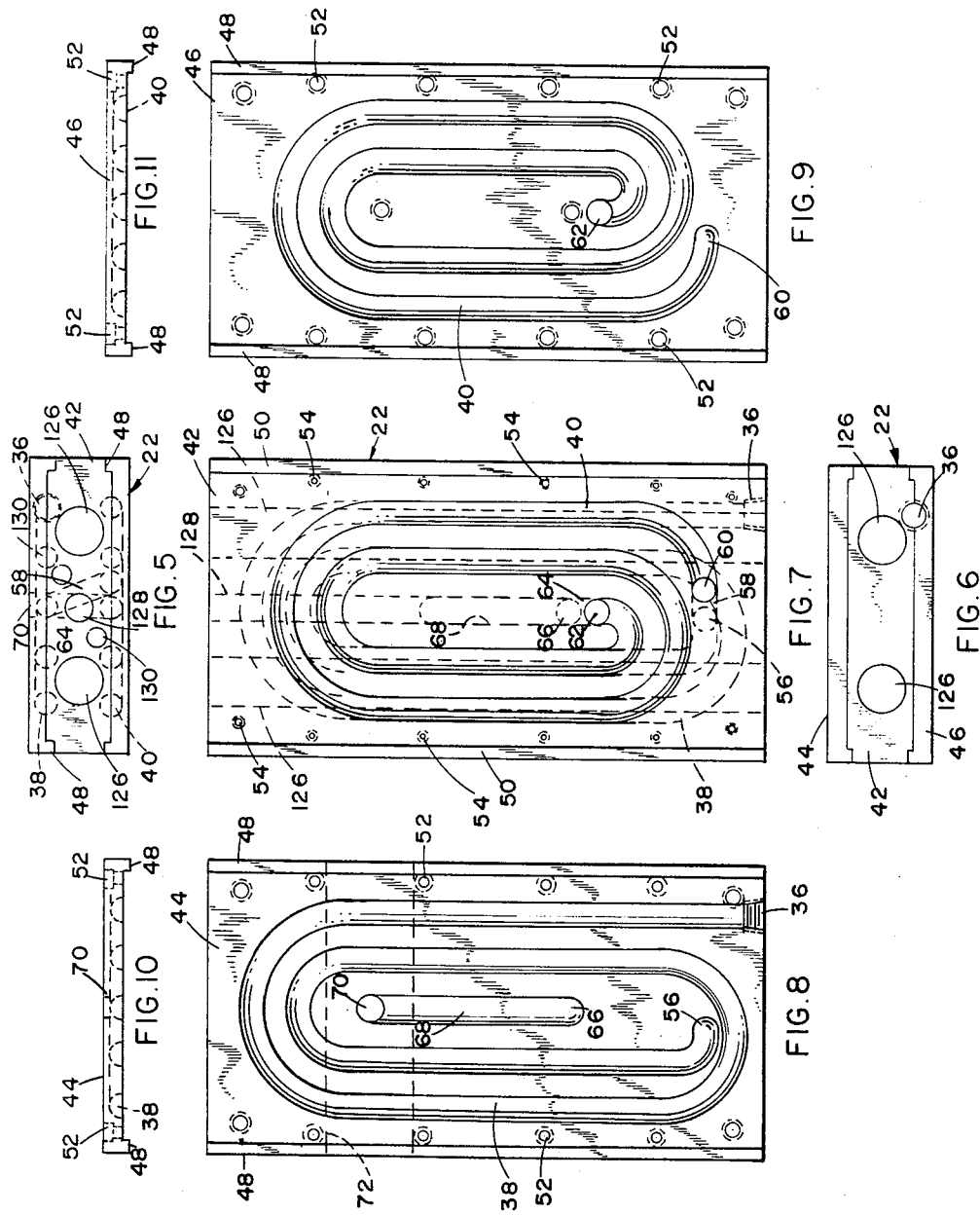

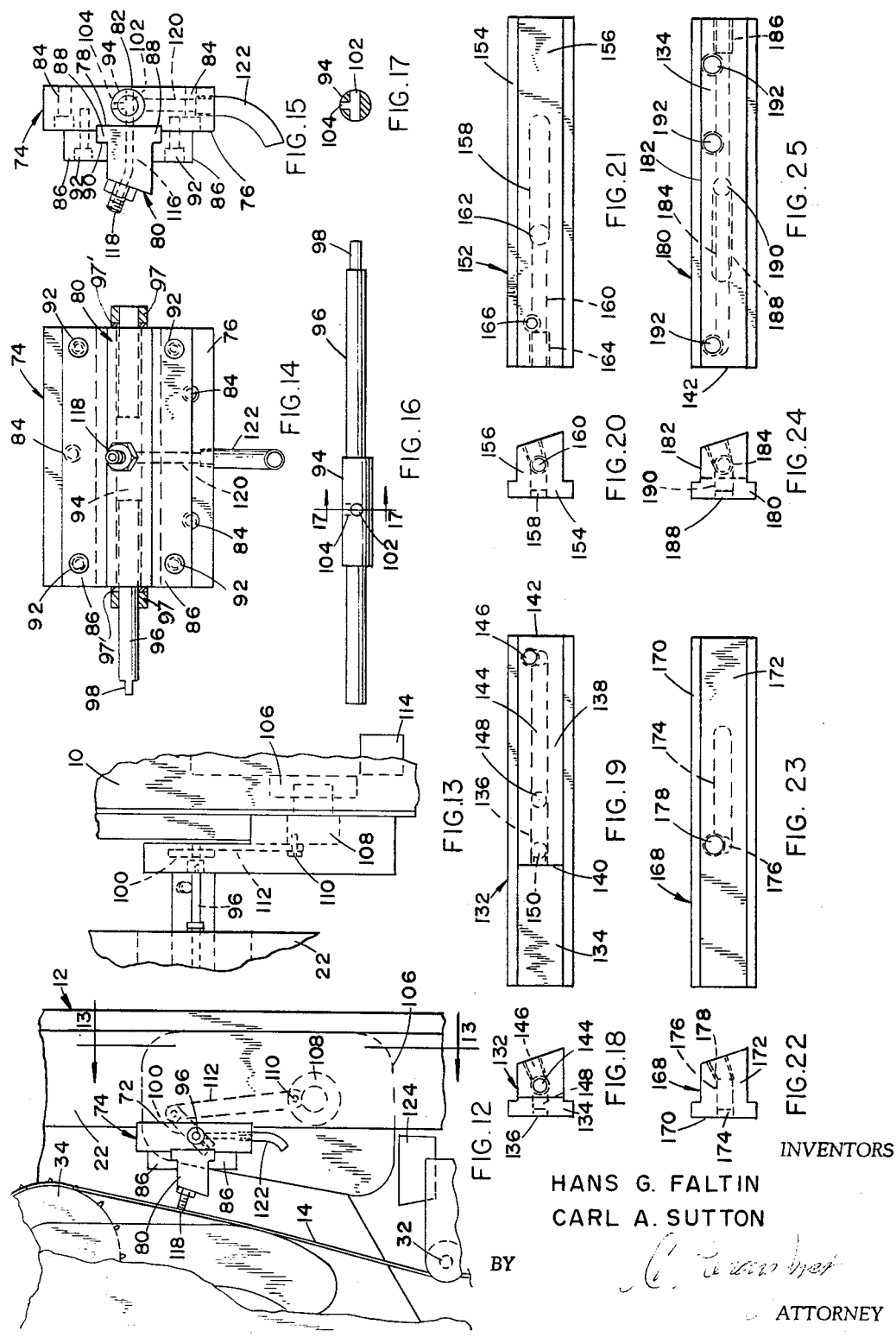

United States Patent Office

3,504,653
Patented Apr. 7, 1970

3,504,653
ADHESIVE HANDLING AND COATING MACHINE
Hans G. Faltin, 4135 Wilshire Drive, and Carl A. Sutton, 4281 Old Orchard Road, both of York, Pa. 17402
Filed Nov. 22, 1967, Ser. No. 685,122
Int. Cl. B05c *11/00*
U.S. Cl. 118—5
13 Claims

ABSTRACT OF THE DISCLOSURE

Mechanism to handle strandular adhesive material delivered thereto in solid state and discharge it in heated liquid state for delivery to articles to be adhered thereby to other articles, and provided with means to prevent undesired leakage of liquid adhesive from either the delivery or inlet means of the mechanism when operation is discontinued.

CROSS-REFERENCE TO RELATED APPLICATIONS

The present invention is illustrated in copending application Ser. No. 638,019, filed May 12, 1967, relating to Inserting Machine for High Speed Web Presses and the Like, as an incidental unit cooperating therewith but not claimed in detail therein. Mechanism suitable for feeding solid strandular adhesive material to the mechanism of the present invention also comprises the subject matter of co-pending application Ser. No. 676,127, filed Oct. 18, 1967, now abandoned.

BACKGROUND OF THE INVENTION

This invention relates to the delivery of strandular adhesive material, which is normally solid at room temperatures, to heating means for conversion thereof to liquid condition and discharging a fluid stream of said adhesive from discharge means, such as a nozzle, for application thereof to articles or objects to receive the same in order that these may be adhered and affixed to other items or objects. Without restriction thereto, one type of mechanism requiring adhesive heating means of such type is an insert or outsert feeding mechanism of the type illustrated in co-pending application Ser. No. 638,019, referred to above, by which a strip of connected sheet-like members are separated from each other and respectively are delivered sequentially to a web for adherence thereof to said web at predetermined locations as the web advances, for example, at a high rate of speed.

Heating devices for strandular adhesive material have been available heretofore, but, in general, such heating devices have possessed certain inherent disadvantages, particularly either at the discharge or inlet ends of the heating means. In certain of said devices, when stoppage or discontinuance of the flow of liquid adhesive material occurred, dripping of a certain amount of residual liquid adhesive from the delivery nozzle took place, this being discharged either upon the objects to receive the same or dropping onto a certain area of the machine and causing a mess which it was necessary to remove.

A further difficulty, in particular, has resulted at the inlet end of the heater means into which the solid strandular material is fed, whereby upon the discontinuance of the discharge of liquid adhesive material from the discharge nozzle thereof, some the heated, fluid adhesive was discharged through the entrance end of the heating means along the solid strandular adhesive material being fed thereto, thus not only creating a messy situation, but substantially hindering the feeding of said solid strandular material to the heating means when subsequent feeding thereof to said means was resumed.

The foregoing difficulties in existing adhesive heating mechanism occur particularly when it is desired to feed solid strandular adhesive material upwardly to the entrance end of heating means therefor and especially to discharge the same through a discharge nozzle at a level above the inlet end of said heating means. Under such circumstances, it can readily be appreciated that the undesired escape or leakage of melted adhesive downwardly through the entrance end of the heating means, and particularly upon solidification thereof occurring upon the upwardly directed incoming strand of material, will substantially interfere with the subsequent feeding thereof through the inlet opening of the feeding means.

Due also to the fact that when solid type adhesive material is reduced to fluid condition in appropriate heating means, and a certain amount of inherent pressure is created in the melted mass, it readily can be appreciated that the location of the control valve for the liquid adhesive is highly critical. In existing adhesive heating mechanisms, the arrangement in general has been such that at least a certain amount of liquid adhesive remains in the passage means between the discharge port and the valve, whereby the aforementioned inherent expansion characteristics of the material causes a certain amount of discharge and dripping of the liquid adhesive from the discharge nozzle after any such control valve is closed. This results not only in a messy situation but also usually in damage to a certain number of items which are to receive the adhesive due to dripping of the adhesive thereon in undesired quantities and at undesired locations.

SUMMARY OF THE INVENTION

It is the principal object of the present invention to provide heating means for solid strandular adhesive material which is provided with a number of improvements especially at the inlet and discharge ends of the passage means for the adhesive within the heating means. In regard to the improvements at the inlet end of the passage through the heating means, one of the advantages afforded by the present invention comprises the utilization of heat-insulating means which are of such nature as to form a heat barrier between heating temperatures within the heating means and the oncoming strand of solid adhesive material.

Further, such heat barrier is formed preferably from material which is not only of a heat-insulating nature but also is highly resistant to the adherence thereto of melted or liquid adhesive. Still further, the length of the passage through said heat barrier means is sufficient that any liquid adhesive which attempts to escape through said passage will be chilled, without adhering to the walls of said passage, and thus not interfere with the subsequent resumption of movement of the strand of solid adhesive material through said entrance passage when such resumption is desired.

It is a further object of the invention to provide improvements in the discharge means for liquid or fluid adhesive from said heating means, said improvement not only residing in the nature of nozzle and nozzle-supporting mechanisms which preferably are interchangeable with each other to suit to maximum advantage the desired location for a stream of liquid adhesive to items to receive the same, but also providing valve means adjacent said discharge nozzle means and operable either upon an accidental break in the supply of items or objects to receive the stream of adhesive, or at the end of desired operation of the adhesive-applying mechanism, to close the supply of liquid adhesive to said discharge nozzle.

In order to prevent any undesired dripping of liquid adhesive from the nozzle means after such closing of the supply thereto, the apparatus is further provided with drainage means with which the valve communicates when in closed position so as to direct residual liquid adhesive to said drainage means rather than to the nozzle which would normally be the result of the inherent pressure in the liquid adhesive moving through the passage means therefor in said heating means. Such arrangement thereby prevents damage either to the mechanism per se or the items or articles to which liquid adhesive is desired to be applied.

A further object of the invention is to provide simple but highly effective valve-actuating means preferably in the form of a motor having a crank thereon and a crank arm connected to one end of the control valve. Said crank arm, preferably, is oscillatable through a 90° arcuate movement, respectively between open and closed position, and a link extends between said crank and crank arm. Also, a control switch of a timing nature is connected in the circuit to said motor and is operable to actuate said motor for only short periods adequate to move the crank thereon through cycles of 180° of movement which results in oscillation of the crank arm upon the valve member through said 90° arc of movement. Said control switch preferably is in circuit either with the master control switch of the machine with which the present invention is incorporated or safety switches contained in said machine which, for example, are operable upon a break in the supply of items to receive the stream of liquid adhesive, whereupon the machine is stopped.

Details of the foregoing objects and other objects thereof are set forth in the following specification and illustrated in the accompanying drawings comprising a part thereof.

BRIEF DESCRIPTION OF THE DRAWINGS

FIG. 1 is a fragmentary side elevation of an exemplary machine of a type to which the adhesive-handling mechanism comprisinig the present invention is applicable, said mechanism being illustrated in the overall arrangement of the machine shown therein.

FIG. 2 is a fragmentary vertical elevation of the machine shown in FIG. 1 as viewed from the right-hand side thereof in said figure.

FIG. 3 is an enlarged transverse section of a heat barrier member comprising part of the adhesive-handling mechanism of the present invention.

FIG. 4 is a top plan view of the heat barrier shown in FIG. 3 as seen on the line 4—4 thereof.

FIGS. 5 and 6 respectively are top and bottom plan views of the heater unit of the adhesive-handling mechanism of the present invention.

FIG. 7 is an elevational view showing one face of the central member of the heating unit shown in FIGS. 5 and 6.

FIGS. 8 and 9 respectively are elevations of the inner faces of the front and rear plates connectible to opposite sides of the central member shown in FIG. 7 to establish circuitous passageways in said heating unit.

FIGS. 10 and 11 are top plan views respectively of the front and rear cover plates shown in FIGS. 8 and 9.

FIG. 12 is a fragmentary side elevation of a portion of the machine shown in FIG. 1, illustrated on a larger scale than employed in FIG. 1, and illustrating certain details of operating mechanism of the adhesive-handling mechanism comprising the present invention.

FIG. 13 is a fragmentary vertical elevation of the mechanism shown in FIG. 12 as seen on the line 13—13 of said figure.

FIG. 14 is a front elevation, partly in section, illustrating details of discharge mechanism for the liquid adhesive prepared by the mechanism comprising the present invention.

FIG. 15 is a side elevation of the discharge mechanism shown in FIG. 14.

FIG. 16 is a side elevation of the valve member per se included in the discharge mechanism shown in FIGS. 14 and 15.

FIG. 17 is a transverse sectional view of the valve member shown in FIG. 16 as seen on the line 17–17 thereof to illustrate passage means therethrough.

FIGS. 18 and 19 respectively are end and side elevations of one embodiment of supporting means for the discharge nozzle arranged to be carried by the discharge means shown in FIGS. 14 and 15.

FIGS. 20 and 21 respectively are end and side elevations of another embodiment of supporting means for the discharge nozzle from that shown in FIGS. 18 and 19.

FIGS. 22 and 23 respectively are end and side elevations of a still further embodiment of supporting means for the discharge nozzle from those illustrated in FIGS. 18–21.

FIGS. 24 and 25 respectively are end and side elevations of a still further embodiment of supporting means for the discharge nozzle from those shown in FIGS. 18–23 and primarily comprising a universal embodiment of nozzle-supporting means shown in FIGS. 22 and 23.

FIGS. 26 is an end view of the embodiment of nozzle-supporting means shown in FIGS. 24 and 25 illustrating a nozzle in operative position.

FIG. 27 is an end view similar to FIG. 26 but showing a plug operatively positioned on said means.

DESCRIPTION OF THE PREFERRED EMBODIMENTS

Referring to FIGS. 1 and 2, an exemplary machine is illustrated therein comprising an insert or outsert feeding maching in which an adhesive-handling mechanism 12 is embodied for purposes of delivering a preferably continuous stream of liquid adhesive to one surface of a strip of inserts or outserts 14 which are moved by the machine past a suitable discharge nozzle positioned upon the handling mechanism 12. The continuous strand of adhesive 18, which is solid at room temperature, for example, is fed at a predetermined rate of speed by strandular feeding unit 20 of the type such as illustrated, for example, in co-pending application Ser. No. 676,127. It is to be understood, however, that the adhesive-handling mechanism 12 may be employed with various other types of mechanisms and machines requiring the application of a stream of liquid adhesive to articles moving past the discharge nozzle of the handling mechanism 12 at a desired rate of speed. Also, it is to be understood that feeding means for the strandular material is not to be restricted to the type illustrated by the exemplary feeding unit 20. However, the handling mechanism 12 has been designed particularly to operate in a substantially vertical position and receive the oncoming strand of solid adhesive material into the lower end thereof, while discharging the liquid stream of adhesive at a level above the inlet means of the mechanism 12.

Inasmuch as the handling mechanism 12 has been designed especially to be used in a feeding machine 10 of the type illustrated in FIGS. 1 and 2, though it is not restricted to such use, it is convenient in order to explain the function of the mechanism 12, to describe the same in relation to at least certain elements of the feeding machine 10. Accordingly, details of the mechanism 12 now will be described in relation to the various figures illustrated in the drawings, as follows.

The handling mechanism 12 primarily comprises a compact, block-like heating unit 22, details of which are best illustrated in FIGS. 5–11, which details are decribed hereinafter. The heating unit preferably derives its heat from electrical resistance members of suitable commerical type disposed within the unit. The temperature of said units is controlled automatically by thermostatically operated switches, not shown, in control unit 24. The handling mechanism 12 also is mounted closely adjacent one side wall 26 of the housing for the feeding machine 10 and is fixedly positioned relative thereto.

The strip 14 of inserts or outserts, for example, are moved from a supply source 28, through a tension-imparting unit 30, past a safety control unit 32 and at least partially around a feed roller 34 which is driven at a predetermined rate of speed. The roller 34, for example, is of the pin type and the exemplary strip 14 has a row of perforations matching the same to insure a desired feed rate for the strip 14 which is placed under tension incident to passing safety control unit 32. The control unit 32 is connected in series with the circuit which controls the operation of the main driving motor, not shown, of the feeding machine 10. Thus, when either a break occurs in the strip 14 or the end of such strip is reached, the control unit 32 functions to stop the operation of the feeding machine 10 until either the break is repaired or a new supply of the strip 14 is placed in the machine and normal operation is resumed. The control unit 32 also is included in the circuit of certain operating means associated with the handling mechanism 12, as will be explained hereinafter.

Strandular adhesive material 18 of the type preferably used in conjunction with the handling mechanism 12 may be of any desired cross-sectional shape but any such selected cross-sectional shape is uniform through the length of the strand. One appropriate configuration of strandular adhesive material is substantially cylindrical in shape and is provided with a pair of longitudinal grooves along diametrically opposite locations extending inward toward each other for the reception of feeding elements, for example, incorporated in the feeding unit 20.

Especially for convenience of supplying a substantial coil, for example, of strandular material 18, it is preferred that the supply thereof, not shown, be positioned below the feeding unit 20 which, in turn, is preferably below the heating unit 22. Thus, as will be seen especially from FIGS. 6–8, the heating unit 22 is provided with an inlet opening 36 preferably in the bottom of the heating unit 22 to permit the feeding of the solid strandular material 18 into the first passage 38 of a pair of similar spiral-type passages respectively disposed within planes parallel to each other but spaced transversely as readily can be seen from FIG. 5.

The other spiral passage 40 is adjacent the opposite side of the heating unit 22. Particularly for convenience in manufacturing, the passages 38 and 40 are formed within the unit 22 by providing said unit with a central member 42. Connected firmly respectively to the opposite faces of the central member 42 are a front cover plate 44 and a rear cover plate 46. The spiral passage 38 is formed between the front cover plate 44 and one face of the central member 42, said passage preferably being substantially circular in cross-section and one-half thereof being formed by a groove which is semi-circular in cross-section in the inner face of the front cover plate 44 and the opposite half thereof being formed in the adjacent face of central member 42.

The opposite spiral passage 40 is formed by one-half of the same being in the inner face of rear cover plate 46 and the other half in the adjacent face of central member 42. To insure proper location of the front and rear cover plates 44, 46 with respect to the opposite faces of central member 42, it will be seen that the opposite edges of said cover plates 44 and 46 are provided with positioning ribs 48 which respectively are received within complementary longitudinal grooves 50.

To firmly secure the plates 44 and 46 in operative position against the opposite faces of central member 42, a series of appropriate holes 52 are formed along opposite edges of the cover plate for the reception of clamping screws, the heads of which are preferably countersunk into the outer faces of said cover plates, and the threaded ends of the screws are received within tapped holes 54 along opposite sides and extending inward from opposite faces of the central member 42 in registry with the holes 52 in said cover plates. Other forms of connecting means may be utilized but it has been found that those described operate satisfactorily.

Particularly from FIG. 8, it will be seen that upon one of the strands of solid adhesive material entering the inlet opening 36, it moves upwardly and then is coiled around for several nested, somewhat rectangular convolutions along the mating grooves comprising spiral passage 38 until it reaches the terminal end 56 thereof which communicates directly with a somewhat diagonally extending transverse passage 58 which extends through the lower part of the central member 42 so as to communicate with the inlet end 60 of the spiral passage 40 which is disposed between the central member 42 and the rear cover plate 46.

From the inlet end 60 of the spiral passage 40, the path of movement of a heated and at least partially fluid stream of adhesive moves spirally around the several convolutions of passage 40 to the exit end 52 thereof which communicates with another transverse passage 64 extending through the central member 42 from the exit end 62, to the entrance end 66 of a straight, vertically extending passage 68 formed by mating grooves respectively formed in the inner face of front cover member 44 and the corresponding face of central member 42. The upper end of passage 68 communicates with an exit part 70 which extends through the inner wall of a flat, transverse channel 72 formed in the front face of the front cover plate 44 for the reception and positioning of a discharge means or unit 74, details of which are as follows.

The discharge means 74 comprise a base member 76 which preferably is a rectangular block provided in the forward face thereof preferably with another flat, shallow groove 78 for the reception of one of a plurality of interchangeable nozzle supporting members 80, several embodiments of which are illustrated respectively in FIGS. 18–25. The rear or right-hand face of base member 76, as viewed in FIG. 15, is provided substantially centrally thereof with an inlet port 82 which is axially aligned with exit port 70 of the interconnected pair of spiral passages 38 and 40. By the time the adhesive has reached such aligned ports 70 and 82, it is in relatively fluid condition, having been transformed from solid to such fluid condition by heater means described in detail hereinafter. The base member 76 may be secured within channel 72 so as to extend from the front face of heating unit 22 by any suitable means such as a series of headed screws disposed within counter-bored holes 84, the inner ends of said screws being tapped into the front face of heating unit 22.

Positioned on the front face of the base member 76 are a pair of similar clamping bars 86 respectively disposed along opposite sides of the various embodiments of nozzle-supporting members 80, one of which is represented in exemplary manner in FIGS. 14 and 15. Extending along opposite sides of the innermost end of the exemplary member 80 are longitudinal clamping ribs 88 which are received respectively by elongated grooves 90 formed along the innermost corners of the clamping bars 86, as readily may be seen from FIG. 15. The interengaging surfaces of the ribs 88 and grooves 90 preferably are precisely dimensioned so that when the clamping bars 86 are disposed in clamping position, such as by tightening a plurality of spaced, clamping bolts 92, any selected nozzle-supporting member 80 will be firmly clamped in fluid-tight relationship with respect to the base member 76 of the discharge means 74.

In addition to supporting a selected nozzle-supporting member 80, another essential function of the base member 76 is to support a preferably oscillatable, cylindrical valve member 94 which is supported by a longitudinal shaft 96 that extends from opposite ends of the valve member. Said valve is best illustrated in FIGS. 16 and 17. One end of the shaft 96 also is provided with a flattened extension 98 in order that a crank arm 100 may be securely fixed thereto against relative rotation. As seen particularly from FIG. 17, the valve member 94 is provided with a pair of intersecting passages 102 and 104, preferably in the form of a T, whereby the valve comprises a two-way valve and is arranged to be oscillated through an arc of preferably 90° by mechanism comprising an electric motor 106 having a drive shaft provided with a rotatable head 108 having a crank pin 110 thereon. A connecting link 112 extends between the outer end of crank arm 100 and crank pin 110.

Operation of motor 106 is controlled by a micro-switch 114 having timer means associated therewith, operable, for example, so that whenever the micro-switch 114 is energized, such as by either the master switch of the machine 10 being opened or a break occurring in the strip 14, or the end of the latter being reached, so as to activate safety control unit 32, for example, the motor 106 will operate only sufficiently to rotate the rotatable head 108 180°. The length of the link 112 which is connected between crank pin 110 and the end of crank arm 100 and the length of the latter are such that the aforementioned movement of the rotatable head 108 will move the crank arm 100 and the corresponding valve shaft 95 through an arc of 90°.

From FIG. 15 especially, it will be seen that when the valve member 94 is disposed as shown therein with the interconnecting passages 102 and 104 in the positions shown, the valve is in open position, wherein the passage 102 extends between the inlet port 82 in base member 76 and the discharge port 116 shown in simplified, exemplary manner extending transversely through the nozzle-supporting member 80 for communication with the actual removably mounted nozzle 118 carried by the member 80. When, however, the valve member 94 is moved to closed position, with reference to FIG. 15, the valve member will be moved counterclockwise and thereby dispose one end of the passage 102 in communication with a downwardly extending drain passage 120 which terminates in a waste discharge conduit 122, while the opposite end of passage 102 is blocked by the inner wall of the bore in base member 76 within which the valve member 94 is rotatably exposed.

As thus described above, the intersecting cross-passage 104 will be positioned in communication with the inlet port 82 in base member 76 and the inner end of passage 104 communicates with passage 102, whereby the fluid adhesive which inherently is under at least limited pressure within the circuitous, spiral passages 38 and 40 within heating unit 22, will be shut off from communication with discharge port 116 of nozzle-supporting member 80 and may drain freely from the discharge end of conduit 122 and fall by gravity, for example, into a waste receptacle 124 of suitable capacity, illustrated in exemplary manner in FIGS. 1 and 12.

Under the foregoing circumstances, the feeding of the strand 18 of solid adhesive to the handling mechanism 12 will have been stopped incident to the opening of the master switch or the accidental disruption of the strip 14 or the exhaustion of said strip, thereby causing actuation of the control unit 32. The internal expansion of the liquid adhesive within the heating unit 12 will only be of limited amount and waste discharge thereof will occur for only a very short period but it is important to note that the discharge of such expanding slight amount of excess adhesive will be discharged to an appropriate waste receptacle provided therefor, as distinguished from possibly continuing to drip through the delivery end of nozzle 118 either onto the mechanism below the same or onto the articles to which the adhesive has been applied, such as the strip 14 of insert or outsert items, for example. Also, the extremely small amount of adhesive remaining under such circumstances within the discharge port 116 is so slight that no waste discharge thereof normally will occur.

To provide adequate heat to the heating unit 22, it has been found that the most effective and economical method for supplying the same within a minimum of space and simple mounting needs, consists in the provision of preferably a pair of parallel, transversely spaced bores 126 which extend longitudinally within the central member 42 of the heating unit 22. If desired, these bores may extend entirely through the central member 42 from one end to the other. The heating elements, which are not specifically illustrated, may comprise commercial electrical resistance heating elements of appropriate heating capacity, the same being connected to an appropriate supply circuit, not shown, which extends between said heating elements and the control unit 24 shown in exemplary manner in FIGS. 1 and 2.

For purposes of controlling the heat delivered by the heating elements within the bores 126, a thermostatic control element, not shown, may be mounted preferably centrally of the central member 42 of the heating unit 22, within a suitable longitudinally extending bore 128. If desired, auxiliary safety-type thermostats may be provided within additional longitudinally extending bores 130 and all of said thermostats within the bores 128 and 130 readily may be connected by conventional circuit means, not shown, extending to and from the control unit 24. Such control unit also further may contain appropriate, adjustable, switch-actuating means responsive to high and low temperature settings which, when attained by the heating elements within the bores 126, will actuate the thermostatic control means to either close the circuit to the heating means or disconnect the same therefrom, as required.

Although the nozzle-supporting member shown in FIGS. 14 and 15 in examplary manner has been generically indicated by the reference numeral 80, it is to be understood that the same is merely illustrative in a generic manner of a series of interchangeable nozzle-supporting members which may be individually selected for mounting within the supporting means therefor upon base member 76. The various different embodiments of exchangeable nozzle-supporting members are respectively illustrated both in end and side elevation in FIGS. 18–25, details of which are as follows.

Referring to FIGS. 18 and 19, the nozzle-supporting member 132 shown therein comprises a base portion 134, the bottom surface of which is provided with a milled slot 136. A longitudinally extending body block 138 extends between an inner end 140 thereof and the opposite end 142 of base portion 134. Extending longitudinally within the body block 138 is a longitudinal bore 144 which extends inwardly from the inner end 140 of body block 138 and terminates a short distance from the opposite end 142 thereof. A tapped hole 146 which threadably receives the removable nozzle 118 extends inwardly to the innermost end of longitudinal bore 144 and a communicating hole 148 extends between the milled slot 136 and the longitudinal bore 144. The end of the bore 144 adjacent the inner end 140 of body block 148 is plugged by any suitable means such as a set screw 150.

The above-described arrangement of the nozzle-supporting member 132 is such that when it is clamped in position upon base member 76 by the clamping bars 86, the discharge nozzle 118 will be disposed adjacent one end of the discharge means 74, whereby, for example, a small stream of liquid adhesive, of desired width or diameter, will be continuously discharged, for example, along one edge portion of the strip 14. Accurate locating or positioning said stream of adhesive at an exact desired position with respect to the strip or other means to receive the same may be achieved due to the amount of transverse adjustment made possible for the supporting member 132 by means of the longitudinally extending milled slot 136 formed in the rear face thereof which is in communication with the discharge opening in base member 76 that is axially aligned with the inlet port 82 therein. Thus, when the valve member 94 is in open position, fluid adhesive will be received within the milled slot 136 for delivery through the passages communicating therewith which will supply the nozzle 118 when connected into the tapped hole 146.

Referring to FIGS. 20 and 21, still another embodiment of nozzle-supporting member 152 is illustrated which has a base portion 154 substantially identical with the base portion 134 of the embodiment shown in FIGS. 18 and 19. However, in the embodiment of FIGS. 21 and 22, the body block 156 preferably extends for the full length of the base member 154. The bottom surface of the base portion 154 has a milled slot 158 occupying substantially about ⅓ of the length of the entire supporting member 152. Extending inward from the left-hand end of the body block 156, as viewed in FIG. 21, is a longitudinal bore 160, the inner end of which communicates with a communicating hole 162 which extends from one end of slot 158 upwardly into body block 156 sufficiently to communicate with the inner end of the bore 160. The outer end of said bore is closed by a short plug 164 and immediately adjacent the inner end thereof is a tapped hole 166 which communicates with bore 160 and receives the removable nozzle 118.

It will be understood that when the nozzle-supporting member 152 is mounted upon the base member 76 in lieu of the member 80 shown thereon in exemplary manner in FIGS. 14 and 15, for example, the inlet port 82 which extends entirely through the base member 76 will communicate with the milled slot 158 for purposes of permitting the flow of fluid adhesive through the bore 160 and outwardly through the nozzle 118 which, it will be understood, is mounted in the tapped hole 166. The length of the milled slot 158 permits a substantial amount of lateral adjustment of this particular embodiment of nozzle-supporting member 152 relative to the base member 76 of discharge means 74 in order to permit the nozzle 118 to be located precisely within any one of a substantial range of positions for discharge of fluid onto objects to receive the same.

A still further embodiment of nozzle-supporting member 168 is shown respectively in end and plan view in FIGS. 22 and 23. This embodiment includes a base portion 170 which is similar to the base portions of the preceding embodiments and the body portion 172 also extends for the full length of the member 168. The bottom of the base portion 170 is provided with a milled slot 174 a substantial length and, adjacent one end thereof, a communicating hole 176 extends perpendicularly through body portion 172 and terminates in a tapped hole 178 which receives the discharge nozzle 118. Hence, it will be seen that this embodiment is relatively simple but nevertheless represents a somewhat different manner of forming a useful nozzle-supporting member in addition to those described in the preceding embodiments.

Still another embodiment of nozzle-supporting member 180 is illustrated respectively in end and top plan views in FIGS. 24 and 25. In this embodiment, the basic structure is substantially identical with that shown in the embodiment of FIGS. 22 and 23, except that the latter embodiment might be regarded as a somewhat universal type in that the body-supporting member 180 is similar to the such members of the other embodiments and the body block 182 thereof extends for the full length thereof, a bore 184 extends longitudinally thereof from adjacent one end to substantially the opposite end. One end is closed by plug 186 and the opposite end terminates short of the opposite end 142.

The bottom surface of member 182 has a slot 188 of shallow depth milled therein for a limited length. The ends of slot 188 are spaced substantial distances from the opposite ends of member 182, as shown in FIG. 25. A communicating hole 190 extends transversely between one end of slot 188 and bore 184 to receive liquid adhesive from inlet port 82 and transfer it to bore 184. Extending transversely through body block 182, from the outer surface thereof into bore 184, are a limited number of longitudinally spaced tapped bores 192, the positions of which are more or less strategically designed so that they may selectively receive and position the removable discharge nozzle 118, such as shown in FIG. 26, so as to discharge a stream or stripe of liquid adhesive at a desired transverse position relative to an object moving past said nozzle for the purposes described above.

If it is found that one of the selected bores 192 is not at the exact location desired for such aforementioned discharge of adhesive, the entire member 180 may be adjusted the required amount longitudinally within the seating groove 78, see FIG. 15, in the manner described above relative to the preceding embodiments to cause exact positioning of said nozzle. After mounting the nozzle 118 in a selected bore 192, the other bores 192 are closed tightly, as shown in FIG. 27, by thumb screws 194 upon which a sealing washer 196 preferably is mounted. It will thus be seen that, under at least most conditions of operation requiring a predetermnied position for discharge nozzle 118, the embodiment of discharge arrangement shown in FIGS. 24–27 is substantially universal, yet is relatively simple in construction.

Although a number of different interchangeable nozzle-supporting members 80, 132, 152, 168 and 180 are illustrated, it is only necessary to have a single valve member 94 and its shaft 96. Said member and shaft fit all the nozzle-supporting members with equal facility and the passages 102 and 104 therein will communicate with the inlet ports of the various supporting members.

Interchange of the valve member and shaft within the complementary cavities therefor in the various supporting members is readily effected by removing one of the clamping collars by loosening a radial set screw, not shown, of common type and withdrawing or inserting the shaft and valve axially. Plastic sealing washers 97′ preferably are inserted between each collar 97 and the adjacent end of the selected supporting member.

Referring to FIGS. 1–4, another very important item of the present invention is illustrated therein. It is of prime importance and significance, particularly in situations where the heating unit 22 is mounted substantially vertically as illustrated in FIGS. 1 and 2, for example, in the present apparatus. As described hereinabove, the inlet opening 36 of the arrangement of cooperating spiral passages 38 and 40 in the heating unit 22 is adjacent the bottom or lower end of the heating unit, as is clearly shown in FIGS. 7 and 8. In view of the fact that the strand of solid adhesive 18 is fed upwardly by feeding unit 20 into the inlet opening 36 of the heating unit 22, it readily can be appreciated that when the machine 10 is stopped either because of accidental breaking of the strip 14 or at the completion of a feeding operation thereby, the circuitous passage arrangement within the heating unit 22 is filled with adhesive. Such adhesive is in various states of physical condition from hot and fluid adjacent the discharge nozzle 16, to a relatively cold solid state at the inlet opening 36.

The fluid material, as described above, is under a certain amount of pressure during normal operation of the machine and especially during operation of the adhesive heating mechanism thereon. Accordingly, when the valve 94 is closed when the machine is stopped as described above, there will normally be a tendency of at least some of the liquid adhesive to flow downwardly along the incoming solid strand which is entering inlet opening 36 and thus leak from the machine. Such leakage could be of such type that the adhesive would solidify and thereby form somewhat of an enlargement around the incoming solid strand at the inlet opening 36, whereby upon resumption of feeding the adhesive strand upwardly through inlet opening 36, difficulty would be encountered, or feeding would be impossible. Further, a messy situation would have to be cleaned up under normal circumstances.

The present invention obviates the foregoing difficulties from occurring by providing a heat-insulating unit 198 which is fixedly supported in coaxial relationship with the inlet opening 36. Preferably, as shown particularly in FIG. 3, an externally threaded nipple sleeve 200 is formed upon or is threaded into the normally upper portion of a supporting member 202 for a heat-insulating member 204. The upper end of the nipple sleeve 200 is threaded into the tapped portion of the inlet opening 36 of the heating unit 22 shown in FIGS. 7 and 8. Supporting member 202 preferably is formed from metal, such as aluminum which has a high thermal coefficient to dissipate heat. The lower end of member 202 has a socket 206 extending upwardly therein for the reception of a supporting plug formation 208 on the upper end of thermal barrier member 204 which is secured therein by a plurality of radial screws 210, or the equivalent. When the heat-insulating unit 198 is disposed in operative position adjacent the inlet opening 36 of heating unit 22, the heat-supporting member 202 will be substantially in abutting engagement with the bottom face of the heating unit 22.

It has been found that a highly suitable material from which the thermal barrier member 204 may be formed is an appropriate synthetic resin, such, for example, as a commercial embodiment sold under the trademark Teflon. In addition to having a very low coefficient of thermal conductivity, synthetic resin of this type is self-lubricating to a high degree, the same being substantially frictionless and highly resistant to other substances adhering thereto. It will be seen that the member 204 has a hole 212 extending axially therethrough which preferably is substantially the same diameter as the inner diameter of the nipple sleeve 200, both of these diameters being only very slightly greater than the outer diameter of the strand of solid adhesive material 18 which is moved upwardly through the entrance hole 192 and nipple sleeve 184 by the feeding unit 20. Thermal barrier member 204 also preferably is provided with heat dissipating means comprising a series of circumferential grooves 214 which form a plurality of axially spaced circular heat dissipating flanges 216 which afford adequate amount of heat exchange with the ambient atmosphere to aid in maintaining the entering strand of adhesive in solid condition and also cool any liquid adhesive tending to run along said strand so as to solidify it.

When feeding of the strand 18 ceases, under conditions such as described above, the low thermal conductivity nature of the member 204, especially as aided by the heat dissipating flanges 216 therein, is fully adequate to maintain the section of solid strandular material 18 therein, and especially that portion within the axial hole 212, in solid condition. Further, the clearance between said strand 18 and the wall surfaces of the hole 212 and nipple sleeve 200 is so slight that, in conjunction with the thermal barrier effect afforded by member 204, no downward dripping of fluid adhesive occurs through said space. Further, the arrangement described above affords the highly desirable advantage of the strand of solid material 18 being in condition and position for the immediate resumption of feeding thereof by the feeding unit 20 when the resumption of operation of the machine 10 occurs.

The control arrangement contained within the unit 24 also preferably is such that, either at the commencement of operation of the machine, such as at the beginning of a work day, or after a period of cessation of operation has occurred for any interval of time, the auxiliary safety thermostats, for example, within the bores 130, are so connected to the control circuit that any starting operation of the main power means for the entire machine cannot occur until the temperature within the heating unit 22 has attained a predetermined range which is adequate to assure the delivery of fluid adhesive through the nozzle 118. Further, the extensive circuitous arrangement of passages is adequate to insure rapid reduction of solid adhesive to liquid state therein incident to initiating operation of the machine.

We claim:

1. Mechanism for handling strandular adhesive material delivered thereto in solid condition including in combination, a heating unit adapted to be mounted substantially vertically in use and having a passageway therein provided with an inlet opening adjacent the bottom thereof to receive said solid strandular material while fed upwardly thereto and a discharge port at the opposite end of said passageway from said inlet opening to deliver a stream of heated liquid adhesive to articles to receive the same as moved past said port for subsequent adherence to other articles, said discharge port being positioned substantially perpendicularly to the plane of said articles as moved past the nozzle, means to move said articles past said nozzle, heating means operable to heat said passageway and transform solid adhesive material to liquid condition, and substantially self-lubricating heat-insulating means adjacent and extending downwardly from said inlet opening of said heating unit and operable to maintain said strandular solid adhesive in solid condition within at least the entrance of said heat-insulating means when movement of adhesive material through said passageway is discontinued, whereby feeding of the solid strandular material through said heat-insulating means may be resumed without impedance upon resumption of operation of said mechanism and discharge of melted adhesive outwardly through said heat-insulating means is prevented.

2. The mechanism for handling strandular adhesive material according to claim 1 further including valve means supported by said heating unit adjacent the discharge port thereof and arranged to control the flow of liquid adhesive from said discharge port.

3. The mechanism for handling strandular adhesive material according to claim 2 further including break-detecting means interconnected to said valve means and having a member engageable with a connected strip of articles moving past said nozzle for application of adhesive thereto, said break-detecting means being operable in response to the interruption of the movement of said strip of articles past said discharge port to close said valve.

4. The mechanism for handling strandular adhesive material according to claim 2 further including relief drainage means adjacent said valve means operable to discharge liquid adhesive material remotely from said discharge port after said valve means is closed to drain excess liquid adhesive away from said valve and thereby substantially prevent any dripping thereof from said discharge port.

5. The mechanism for handling strandular adhesive material according to claim 4 in which said valve means is provided with passage means interconnectable between said discharge port and relief drainage means, whereby when said valve means is moved to close passage of adhesive to said discharge port said passage means in said valve communicates with said relief drainage means and thereby discontinues discharge of liquid adhesive through said discharge port and effects drainage away from said valve means of excess liquid adhesive inherently under pressure in said passage means of said heating unit during normal operation thereof.

6. The mechanism for handling strandular adhesive material according to claim 3 in which said control valve comprises a cylindrical valve member having radial passage means therein and means supporting the same for oscillation between a discharge position in which said passage means communicates with said discharge port of said discharge means and a closed position in which said passage means communicates with a relief drain positioned to communicate with said valve means.

7. The mechanism for handling strandular adhesive material according to claim 6 further including a motor provided with a crank, and means interconnecting said crank to said oscillatable valves member of said valve means and operable by said break-detecting device to move said valve member between said discharge and closed positions thereof.

8. The mechanism for handling strandular adhesive material according to claim 7 in which said motor is an electric motor and said mechanism further including a control switch provided in a circuit between said motor and a source of current, said control switch having timer means operable during a single cycle of valve movement between said open and closed positions thereof relative to said discharge port, whereby said control switch is operable to move said valve from open to closed position upon discontinuance of the desired flow of liquid adhesive from said discharge port.

9. The mechanism for handling strandular adhesive material according to claim 8 further including a crank arm connected at one end to said oscillatable valve member and arranged for movement through an arc of approximately 90°, said crank upon said motor being arranged for controlled movement of approximately 180° by said timing switch, and a link extending between said crank on said motor and said crank arm upon said oscillatable valve, whereby 180° movement upon the crank arm oscillates said crank arm on said valve approximately 90° respectively between open and closed positions thereof as required.

10. The mechanism for handling strandular adhesive material according to claim 1 in which said heat-insulating means comprises a body of synthetic resin of low thermal conductivity and very low coefficient of friction and in which said passage means is closely complementary in shape to the strandular material to be fed therethrough and said passage means being of a length adequate to prevent heat from said heated passageway from melting the portion of said strandular material disposed within at least the lower end of the passage means in said insulating means.

11. The mechanism for handling strandular adhesive material according to claim 1 in which said heating unit comprises a central member provided with partial grooves on opposite faces thereof, cover plates respectively provided with partial grooves complementary to the partial grooves on said opposite faces of said central member and arranged to cooperate with the same when said cover plates are secured respectively to said opposite sides of said central member to form operative circuitous passages in said heating unit, and said central member having said heating means therein and also having sensing elements of control thermostat means operable respectively to provide adequate heat to said heating unit to melt said strandular adhesive material and control the degree of temperature in accordance with the setting of said control thermostat means.

12. The mechanism for handling strandular adhesive material according to claim 11 in which said plural circuitous passages respectively are disposed substantially in parallel planes in said heating unit and said central member thereof being provided with passages extending transversely therethrough between said plurality of circuitous passages in said parallel planes to connect the same, thereby providing substantial lengths of circuitous heating passages within a minimum volume occupied by said heating unit.

13. The mechanism for handling strandular adhesive material according to claim 1 further including discharge means supported by said heating unit and having said discharge port therein, and said mechanism also including means supporting said discharge means relative to said heating unit for adjustable positioning of said discharge port in a horizontal direction and thereby position the discharging stream of liquid adhesive therefrom at a desired location with respect to articles when moving vertically past said discharge port to receive said adhesive.

References Cited
UNITED STATES PATENTS

| | | | |
|---|---|---|---|
| 2,319,476 | 5/1943 | Ray | 118—2 |
| 2,734,224 | 2/1956 | Winstead | 118—410 X |
| 2,905,142 | 9/1959 | Burke | 118—411 |
| 2,972,670 | 2/1961 | Dorosz et al. | 118—410 X |
| 3,181,501 | 5/1965 | Dean | 118—410 X |
| 3,314,573 | 4/1967 | Newton | 222—146 |
| 3,344,767 | 10/1967 | Talarico | 118—2 |
| 3,347,206 | 10/1967 | Schmidt-Salzmann | 118—8 |

WALTER A. SCHEEL, Primary Examiner

J. P. McINTOSH, Assistant Examiner

U.S. Cl. X.R.

118—8, 410